United States Patent
Usami

(10) Patent No.: US 9,509,001 B2
(45) Date of Patent: Nov. 29, 2016

(54) FUEL CELL SYSTEM AND CONTROL METHOD FOR SAME

(71) Applicant: TOYOTA JIDOSHA KABUSHIKI KAISHA, Toyota-shi, Aichi-ken (JP)

(72) Inventor: Sho Usami, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 14 days.

(21) Appl. No.: 14/715,923

(22) Filed: May 19, 2015

(65) Prior Publication Data

US 2015/0340716 A1 Nov. 26, 2015

(30) Foreign Application Priority Data

May 21, 2014 (JP) ................. 2014-105048

(51) Int. Cl.
*H01M 8/04* (2016.01)
*H01M 8/10* (2016.01)

(52) U.S. Cl.
CPC ......... *H01M 8/04291* (2013.01); *H01M 8/045* (2013.01); *H01M 8/0491* (2013.01); *H01M 8/04253* (2013.01); *H01M 8/04268* (2013.01); *H01M 8/04365* (2013.01); *H01M 8/04507* (2013.01); *H01M 8/04835* (2013.01); *H01M 2008/1095* (2013.01); *H01M 2250/20* (2013.01); *Y02E 60/50* (2013.01); *Y02E 60/521* (2013.01)

(58) Field of Classification Search
CPC .................... H01M 8/04291; H01M 8/04223; H01M 8/04225; H01M 8/04253; H01M 8/04268; H01M 8/04507; H01M 8/04574; H01M 8/04589; H01M 8/043; H01M 8/04302; H01M 8/0432; H01M 8/04365; H01M 8/04492; H01M 8/045; H01M 8/04694; H01M 8/0491; H01M 8/04701; H01M 8/04708; H01M 8/04828; H01M 8/04835; H01M 8/04858; H01M 8/04895
USPC ................. 429/414, 427–429, 431, 442, 450
See application file for complete search history.

(56) References Cited

U.S. PATENT DOCUMENTS

| 2002/0076596 A1* | 6/2002 | Busenbender | H01M 8/02 429/450 |
| 2012/0308905 A1* | 12/2012 | Kawahara | H01M 8/04223 429/414 |
| 2013/0089798 A1* | 4/2013 | Usami | H01M 8/04029 429/414 |

FOREIGN PATENT DOCUMENTS

| JP | 2008-300217 | 12/2008 |
| JP | 2011-113774 | 6/2011 |

*Primary Examiner* — Jonathan G Leong
*Assistant Examiner* — Anne R Dixon
(74) *Attorney, Agent, or Firm* — Finnegan, Henderson, Farabow, Garrett & Dunner, LLP

(57) ABSTRACT

A fuel cell system, including: a fuel cell having at least one combination of an electrolyte membrane and a cathode-side catalyst layer and an anode-side catalyst layer that have a plurality of pores; a control unit that operates the fuel cell such that an output current determined in accordance with an external load is output from the fuel cell; and an output current acquisition unit that acquires an output current of the fuel cell; wherein, when the control unit determines that an anode in-flowing water amount, which flows to the anode-side catalyst layer when the fuel cell continues power generation at a first output current acquired at a prescribed timing, exceeds a prescribed anode-side allowable water amount, the control unit performs current limitation control to operate the fuel cell at a second output current that is higher than the first output current, regardless of a requirement of the external load.

10 Claims, 6 Drawing Sheets

FUEL CELL SYSTEM AND CONTROL METHOD FOR SAME

INCORPORATION BY REFERENCE

The disclosure of Japanese Patent Application No. 2014-105048 filed on May 21, 2014 including the specification, drawings and abstract is incorporated herein by reference in its entirety.

BACKGROUND OF THE INVENTION

1. Field of the Invention

This invention relates to a fuel cell system.

2. Description of Related Art

An available fuel cell has a structure in which an electrolyte membrane is sandwiched between catalyst layers of both polarities (cathode and anode), and is further sandwiched between gas diffusion layers of both polarities. When this fuel cell is started up below freezing point, there is a risk that the water generated during power generation will freeze, and the catalyst layers will separate from the electrolyte membrane. Therefore, technology has been proposed for controlling the operation of the fuel cell in such a manner that the amount of water flowing into the cathode-side catalyst layer does not exceed an allowable amount when starting up a fuel cell below freezing point (see, for example, Japanese Patent Application Publication No. 2011-113774 (JP 2011-113774 A)).

In an available fuel cell system, reaction gas is humidified before being supplied to the fuel cell, in order to maintain a good water-containing state in the electrolyte membrane of the fuel cell. On the other hand, in response to demands for simplification of the fuel cell system, the removal of the humidifier which humidifies the reaction gas has been investigated. Since there is a risk of the electrolyte membrane becoming dry during high-temperature operation, when the reaction gas is not humidified, then it is desirable to make the thickness of the electrolyte membrane smaller than in the related art, in order to maintain a satisfactory water-containing state of the electrolyte membrane. This is because it is considered that, when the electrolyte membrane is made thin, a large amount of water moves from the cathode side toward the anode side (this water is called "reversely diffused water" below), thereby preventing the drying of the electrolyte membrane. However, when there is a large amount of reversely diffused water, there is a risk of the catalyst layer separating from the electrolyte membrane due to freezing of the water on the anode side, when the cell is started up below freezing point.

Therefore, technology for adjusting the amount of water flowing into the anode-side catalyst layer is required. This technology is demanded in order to achieve appropriate operation of the fuel cell, and not only for start-up below freezing point. Apart from this, there have been demands for reduced cost, reduced resource usage, simplified manufacturing, and improved performance, and the like, in available fuel cell systems.

SUMMARY OF THE INVENTION

A first aspect of this invention relates to a fuel cell system, including: a fuel cell having at least one combination of an electrolyte membrane and a cathode-side catalyst layer and an anode-side catalyst layer that are disposed in contact with the electrolyte membrane and have a plurality of pores; an output current acquisition unit which acquires an output current of the fuel cell; and a control unit which operates the fuel cell such that an output current determined in accordance with an external load is output from the fuel cell. The output current acquisition unit acquires a first output current of the fuel cell at a prescribed timing. When the control unit determines that an anode in-flowing water amount, which flows to the anode-side catalyst layer when the fuel cell continues power generation at a first output current acquired at a prescribed timing, exceeds a prescribed anode-side allowable water amount, the control unit performs current limitation control to operate the fuel cell at a second output current that is higher than the first output current, regardless of a requirement of the external load.

According to this fuel cell system, when it is determined that the anode in-flowing water amount exceeds the anode-side allowable water amount, then the fuel cell is operated at a higher output current than the output current upon the determination is made, regardless of the requirement of the external load. In this fuel cell system, irrespective of the timing at which an increase or decrease in the output current is required by the external load, the output current is increased when it is determined that the anode in-flowing water amount exceeds the anode-side allowable water amount. In other words, even if the requirement of the external load is for a uniform output current, or a reduced output current, the output current is increased when it is determined that the anode in-flowing water amount exceeds the anode-side allowable water amount. The range of the increase in the output current may be changed in accordance with the requirement of the external load. Since the anode in-flowing water amount becomes greater when the output current is low, then it is possible to suppress the occurrence of an excessive anode in-flowing water amount, by raising the output current. Therefore, it is possible to suppress insufficiency in the fuel gas due to excessive anode in-flowing water, and decline in the fuel cell performance can be suppressed. Furthermore, it is also possible to suppress separation of the anode catalyst layer from the electrolyte membrane due to freezing of the anode in-flowing water.

The control unit may implement the current limitation control based on the output current, when the acquired temperature is lower than a prescribed temperature. By adopting this configuration, it is possible to implement current limitation control when starting up the fuel cell at low temperature, and so on.

The control unit may determine whether or not the anode in-flowing water amount exceeds the prescribed anode-side allowable water amount, by using the anode in-flowing water amount during a prescribed period set in accordance with the temperature of the fuel cell. By adopting this configuration, a suitable determination can be made on the basis of the temperature of the fuel cell.

A time until the anode in-flowing water amount reaches the prescribed anode-side allowable water amount, when the fuel cell continues power generation at a prescribed output current, may be set as an anode-side allowable time; the control unit may include an anode allowable time table indicating a relationship between the prescribed output current and the anode-side allowable time; and the prescribed output current, at which the anode allowable time and the prescribed period are equal each other, may be set as a lower limit of the second output current. By adopting this configuration, it is possible to implement appropriate current limitation control in accordance with the output current.

The prescribed temperature may be a freezing point. By implementing current limitation control when the temperature of the fuel cell is lower than freezing point, it is possible to supress separation of the anode catalyst layer from the electrolyte membrane due to freezing of the anode in-flowing water.

The prescribed period may be a period until the temperature of the fuel cell becomes equal to or higher than the freezing point. By adopting this configuration, since the anode in-flowing amount is adjusted so as not to exceed the anode-side allowable water amount, during the period until the temperature of the fuel cell becomes equal to or higher than freezing point, then it is possible to more appropriately suppress separation of the anode catalyst layer from the electrolyte membrane due to freezing of the anode in-flowing water.

The control unit, during the current limitation control, may operate the fuel cell at a third output current which is lower than the first output current, regardless of the requirement of the external load, when the control unit determines that a cathode in-flowing water amount which flows to the cathode-side catalyst layer when the fuel cell continues power generation at the first output current exceeds a prescribed cathode-side allowable water amount. By adopting this configuration, it is possible to control the operation of the fuel cell system appropriately in such a manner that, on the cathode side also, the cathode in-flowing water amount does not exceed the cathode-side allowable water amount, in accordance with the output current.

The control unit may determine whether or not the cathode in-flowing water amount exceeds the prescribed cathode-side allowable water amount, by using the cathode in-flowing water amount during a prescribed period set in accordance with the temperature of the fuel cell. By adopting this configuration, a suitable determination can be made on the basis of the temperature of the fuel cell.

The time until the cathode in-flowing water amount reaches the prescribed cathode-side allowable water amount, when the fuel cell continues power generation at a prescribed output current, may be set as a cathode-side allowable time; the control unit may include a cathode allowable time table indicating a relationship between the prescribed output current and the cathode-side allowable time; and the prescribed output current, at which the cathode allowable time and the prescribed period are equal each other, may be set as an upper limit of the third output current. By adopting this configuration, it is possible to implement appropriate current limitation control in accordance with the output current.

A second aspect of this invention relates to a control method for a fuel cell system having a fuel cell having at least one combination of an electrolyte membrane and a cathode-side catalyst layer and an anode-side catalyst layer that are disposed in contact with the electrolyte membrane and have a plurality of pores; the control method including: (a) a step of acquiring an output current of the fuel cell; (b) a step of determining whether or not an anode in-flowing water amount, which flows to the anode-side catalyst layer when the fuel cell continues power generation at the acquired output current, exceeds a prescribed anode-side allowable water amount; and (c) a step of operating the fuel cell at an output current that is higher than the acquired output current, regardless of the output current determined in accordance with a requirement of an external load, when determined is made in the step (b) that the anode in-flowing water amount, which flows to the anode-side catalyst layer when the fuel cell continues power generation at the acquired output current, exceeds the prescribed anode-side allowable water amount.

According to this control method, when it is determined that the anode in-flowing water amount exceeds the anode-side allowable water amount, then the fuel cell is operated at a higher output current than the output current upon the determination is made, regardless of the requirement of the external load. Since the anode in-flowing water amount becomes greater when the output current is low, then it is possible to suppress the occurrence of an excessive anode in-flowing water amount, by raising the output current. Therefore, it is possible to suppress insufficiency in the fuel gas due to excessive anode in-flowing water, and decline in the fuel cell performance can be suppressed. Furthermore, it is also possible to suppress separation of the anode catalyst layer from the electrolyte membrane due to freezing of the anode in-flowing water.

This invention can be implemented in various modes. For example, the invention can be implemented as a moving body in which a fuel cell system is installed, a computer program for realizing the functions of a control method for a fuel cell system, a recording medium on which the computer program is recorded, and so on.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
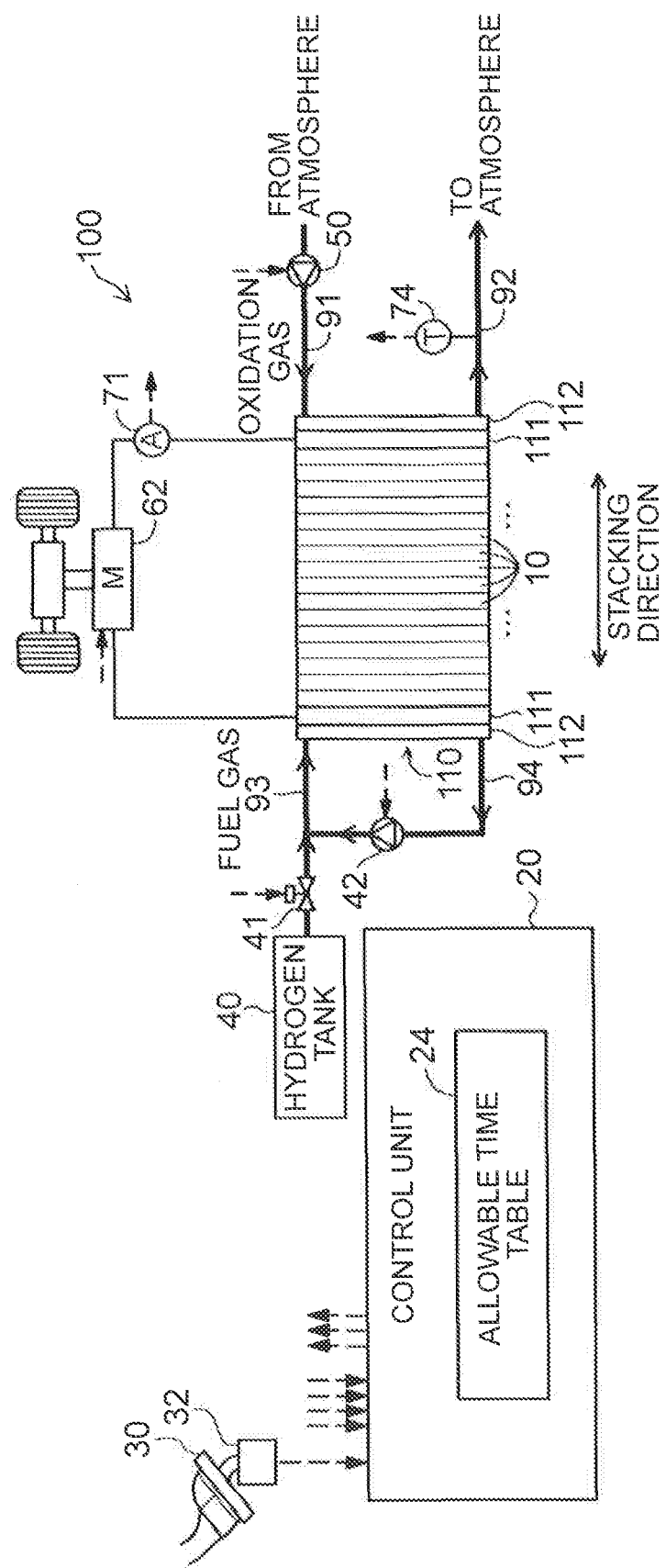
FIG. 1 is an illustrative diagram showing a general configuration of a fuel cell system which is one embodiment of this invention.

A. First Embodiment (A1) Configuration of fuel cell system: FIG. 1 is an illustrative diagram showing the approximate configuration of a fuel cell system which is one embodiment of this invention. In this embodiment, the fuel cell system 100 is mounted in and used in an electric automobile as a system for supplying drive power. The fuel cell system 100 is provided with: a fuel cell stack 110, a hydrogen tank 40, an electromagnetic valve 41, a circulation pump 42, a combustion gas supply path 93, a combustion gas discharge path 94, an air compressor 50, an oxidant gas supply path 91, an oxidant gas discharge path 92, a current measurement unit 71, a temperature measurement unit 74 and a control unit 20.

The fuel cell stack 110 is provided with a plurality of fuel cells 10, which are stacked together, two terminal plates 111, and two end plates 112. The two terminal plates 111 are both electrodes (an anode and a cathode) for the whole fuel cell stack 110, which are disposed so as to sandwich the stacked fuel cells 10 therebetween. The two terminal plates 111 are electrically connected to a drive motor 62 which forms a load. The two end plates 112 are disposed so as to sandwich the two terminal plates 111 therebetween. The two end plates 112 are connected to each other by tension plates (not illustrated), and the fuel cells 10 are fastened with a predetermined compression force in the stacking direction.

Figure 2:
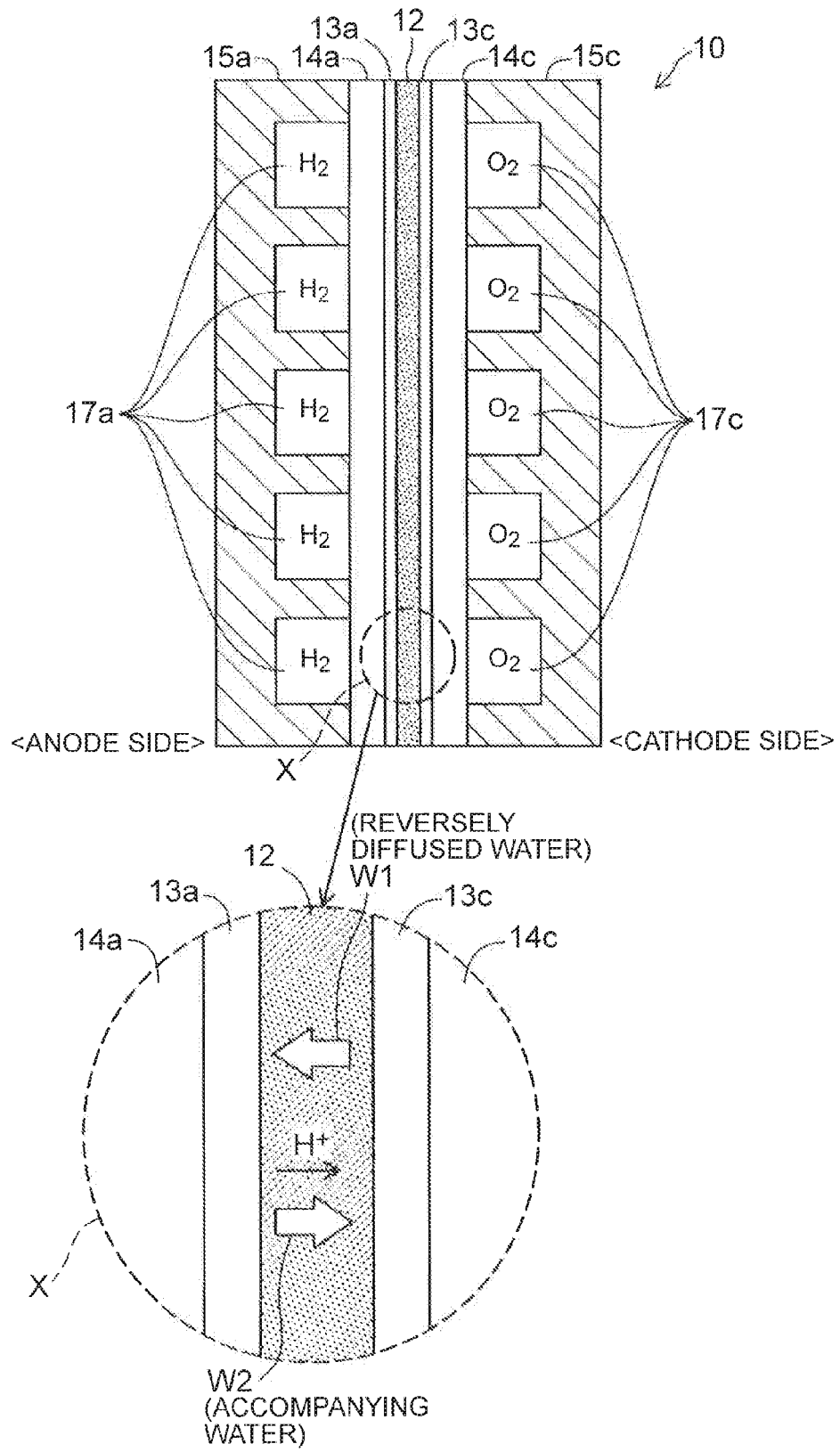
FIG. 2 is a diagram showing a configuration of a fuel cell.

FIG. 2 is a cross-sectional diagram showing the configuration of a fuel cell 10 shown in FIG. 1. As shown in the upper part of FIG. 2, the fuel cell 10 is provided with an electrolyte membrane 12, an anode-side catalyst layer 13a, an anode-side gas dispersion layer 14a, an anode-side separator 15a, a cathode-side catalyst layer 13c, a cathode-side gas dispersion layer 14c, and a cathode-side separator 15c. The lower part of FIG. 2 shows an enlarged view of the region X in the upper part of FIG. 2. These enlarged views are described below.

The electrolyte membrane 12 is a fluorine resin-type ion exchange membrane containing a sulfonic acid group, and may use Flemion (registered trademark), Aciplex (registered trademark), or the like. The electrolyte membrane 12 is not limited to one containing a sulfonic acid group, and may use a membrane containing another ion exchange group, such as a phosphoric acid group or carboxylic acid group, or the like. In this embodiment, the thickness of the electrolyte membrane 12 is 10 µm. The thickness of the electrolyte membrane 12 is not limited to this embodiment and can be set, as appropriate, to 20 µm, 30 µm, etc.

The anode-side catalyst layer 13a is disposed in contact with the electrolyte membrane 12. This anode-side catalyst layer 13a is constituted of a member in which a catalyst is carried in electroconductive particles, and an ionomer, which is a proton conductor. For the catalyst, it is possible to use platinum, for example, or an alloy of platinum and a metal such as ruthenium, iron, or the like. For the electroconductive particles, it is possible to use carbon particles, such as carbon black, or carbon fibers, or the like, for example. For the ionomer, it is possible to employ fluorine resin containing a sulfonic ion group. The ionomer bonds together the electroconductive particles which carry the catalyst. The anode-side catalyst layer 13a has a plurality of fine holes, which are not illustrated. These fine holes are voids which are formed between secondary particles of the electroconductive particles which carry the catalyst (cluster particles formed by collection of a plurality of the primary particles). In this embodiment, the quantity of pores in the anode-side catalyst layer 13a is approximately ⅓ of the cathode-side catalyst layer 13c. The ratio between the pore quantity in the anode-side catalyst layer and the cathode-side catalyst layer is not limited to that of this embodiment. The pore quantity in the anode-side catalyst layer and the cathode-side catalyst layer may be the same, or the ratio thereof can be set, as appropriate, to 1/2, 1/4, 3/2, or the like.

The anode-side gas dispersion layer 14a is constituted of a porous member in order to disperse hydrogen, which is the reaction gas, and to discharge water generated by the electro-chemical reaction, and the like. More specifically, for instance, the anode-side gas dispersion layer 14a is constituted of a carbon porous material, such as carbon paper, carbon cloth, or the like, or a metal porous material, such as a metal mesh or foamed metal.

The anode-side separator 15a can be constituted of a conductive member which retains gas, for example, dense carbon formed by compressing carbon so as to retain gas, or a press-molded metal plate. The anode-side separator 15a has a concavoconvex shape, and a fuel gas flow path 17a is formed between the anode-side separator 15a and the anode-side gas dispersion layer 14a, due to contact between the anode-side separator 15a and the anode-side gas dispersion layer 14a. This fuel gas flow path 17a guides hydrogen gas supplied by the hydrogen tank 40 and the circulation pump 42, to the anode-side gas dispersion layer 14a, and discharges gas (excess hydrogen gas) emitted from the anode-side gas dispersion layer 14a, to the combustion gas discharge path 94.

The configuration of the cathode side is similar to the configuration of the anode side. In other words, the cathode-side catalyst layer 13c has the same configuration as the anode-side catalyst layer 13a. Furthermore, the cathode-side gas dispersion layer 14c has the same configuration as the anode-side gas dispersion layer 14a, and the cathode-side separator 15c has the same configuration as the anode-side separator 15a. The oxidant gas flow path 17c which is formed between the cathode-side separator 15c and the cathode-side dispersion layer 14c guides air supplied from the air compressor 50, to the cathode-side gas dispersion layer 14c, and also discharges gas emitted from the cathode-side gas dispersion layer 14c (excess air and water vapor) to outside the fuel cell 10.

The water generated in the cathode-side catalyst layer 13c due to the generation of power in the fuel cell 10 moves to the anode-side catalyst layer 13a via the electrolyte membrane 12, due to the difference in water concentration between the anode-side catalyst layer 13a and the cathode-side catalyst layer 13c. The water which moves from the cathode-side catalyst layer 13c to the anode-side catalyst layer 13a is called "reversely diffused water W1". On the other hand, when the fuel cell 10 is generating power, as the protons generated in the anode-side catalyst layer 13a move to the cathode-side catalyst layer 13c via the electrolyte membrane 12, water moves from the anode-side catalyst layer 13a to the cathode-side catalyst layer 13c, via the electrolyte membrane 12. The water which moves from the anode-side catalyst layer 13a to the cathode-side catalyst layer 13c is called "accompanying water W2". The directions of movement of the reversely diffused water W1 and the accompanying water W2 are shown in the enlarged diameter in the lower part of FIG. 2. In this embodiment, the electrolyte membrane 12 has a small thickness of approximately 10 µm, and the water moves readily from the cathode-side catalyst layer 13c to the anode-side catalyst layer 13a, and therefore the amount of reversely diffused water W1 becomes large.

The hydrogen tank 40 shown in FIG. 1 stores high-pressure hydrogen gas, and supplies hydrogen gas to the fuel cell stack 110 via the combustion gas supply path 93. The electromagnetic valve 41 is disposed in the combustion gas supply path 93, and adjusts the amount of hydrogen gas which is supplied to the fuel cell stack 110. The circulation pump 42 is disposed in the combustion gas discharge path 94 and circulates the hydrogen gas discharged from the fuel cell stack 110, from the combustion gas discharge path 94 to the combustion gas supply path 93. The air compressor 50 supplies compressed air (oxidant gas) to the fuel cell stack 110 via the oxidant gas supply path 91. The air discharged from the fuel cell stack 110 is discharged into the atmosphere via the oxidant gas discharge path 92.

The current measurement unit 71 is disposed between the fuel cell stack 110 and the motor 62, and measures the output current of the fuel cell stack 110 and sends the measurement value to the control unit 20. The temperature measurement unit 74 is disposed in the oxidant gas discharge path 92 and measures the temperature of the oxidant gas (air) that is discharged, and sends the measurement value to the control unit 20. In the fuel cell system 100, the temperature of the discharge gas is used as the internal temperature of the fuel cell stack 110.

The control unit 20 is configured by a micro-computer provided with a central processing unit and a main storage device. The control unit 20 derives a required output power corresponding to a depression amount of an accelerator pedal 30, on the basis of a detection value acquired from an accelerator position sensor 32, and controls the respective constituent parts of the fuel cell system 100 described above in accordance with the required output power, so as to cause the fuel cell stack 110 to generate electric power.

Furthermore, as described in detail below, when starting up the fuel cell system 100 below freezing point, the control unit 20 implements a current limitation process to control the operation of the fuel cell stack 110 in such a manner that the amount of water flowing into to the electrode catalyst layers (the anode-side catalyst layer 13a and the cathode-side catalyst later 13c) of the fuel cells 10 which constitute the fuel call stack does not exceed an allowable amount. The control unit 20 previously stores an allowable time table 24 to determine the operating conditions of the fuel cell stack 110 in this current limiting process.

Figure 3:
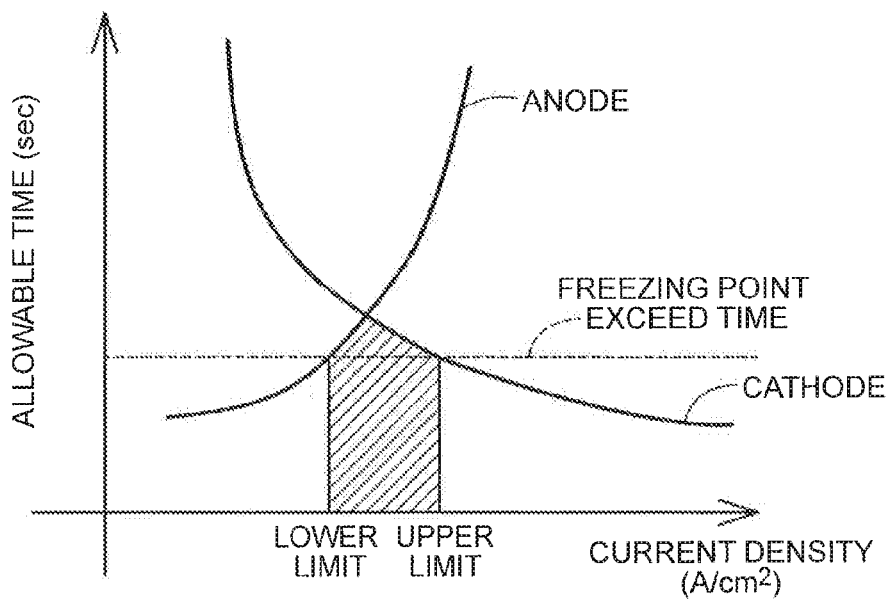
FIG. 3 is an illustrative diagram showing an allowable time table which is stored in a control unit.

(A2) Allowable time table: FIG. 3 is an illustrative diagram showing an allowable time table stored in the control unit. The allowable time table 24 shown in FIG. 3 indicates a relationship between the current density and the time taken until the amount of water flowing into each electrode catalyst layer reaches an allowable amount of water (called "allowable amount of water below"). In this embodiment, the allowable time is calculated as indicated below.

The in-flowing water amount to each electrode catalyst layer and the allowable water amount in each electrode catalyst layer are defined as indicated in (Expression 1) to (Expression 4) below, and the time taken until in-flowing water amount to the electrode catalyst layers becomes equal to the allowable water amount in the electrode catalyst layers is taken to be the allowable time. In this embodiment, the reversely diffused water amount, the accompanying water amount, the water content in the electrolyte membrane 12, and the pore quantity in the catalyst layers, each indicate amounts per unit surface area.

(In-flowing water amount to anode-side catalyst layer 13a)=(Reversely diffused water amount)−(Accompanying water amount)      (Expression 1)

(Allowable water amount in anode-side catalyst layer 13a)=(Water content in electrolyte membrane 12)+(Pore quantity in anode-side catalyst layer 13a)      (Expression 2)

(In-flowing water amount to cathode-side catalyst layer 13c)=(Accompanying water amount)−(Reversely diffused water amount)      (Expression 3)

(Allowable water amount in cathode-side catalyst layer 13c)=(Water content in electrolyte membrane 12)+(Pore quantity in cathode-side catalyst layer 13c)      (Expression 4)

In this embodiment, as described above, the pore quantity in the anode-side catalyst layer 13a is approximately ⅓ of the cathode-side catalyst layer 13c, and therefore the allowable water amount in the anode-side catalyst layer 13a and the allowable water amount in the cathode-side catalyst layer 13c are different values. In (Expression 1), when the in-flowing water amount to the anode-side catalyst layer 13a has become a negative value, there is no movement of water to the anode-side catalyst layer 13a. Similarly, in (Expression 2), when the in-flowing water amount to the cathode-side catalyst layer 13c becomes a negative value, there is no movement of water to the cathode-side catalyst layer 13c.

The reversely diffused water amount and the accompanying water amount are respectively obtained by multiplying the reversely diffused water flux and the accompanying water flux by time. Taking the reversely diffused water flux to be Jg and the accompanying water flux to be Jz, the reversely diffused water flux and the accompanying water flux are calculated by the following equations.

$$Jg = D \times (Cwc - Cwa)/t \quad \text{(Expression 5)}$$

In (Expression 5) given above, D indicates a diffusion coefficient, Cwc indicates a water concentration Cw in the cathode-side catalyst layer 13c, Cwa indicates a water concentration Cw in the anode-side catalyst layer 13a, and t indicates the thickness of the electrolyte membrane 12. In other words, the reversely diffused water flux Jg is inversely proportional to the film thickness t of the electrolyte membrane. The water concentration Cw in the cathode-side catalyst layer 13c and the anode-side catalyst layer 13a is calculated by the following equation.

$$Cw = \epsilon \times \rho \lambda / EW \quad \text{(Expression 6)}$$

In (Expression 6) described above, ε indicates the volume ratio of ionomer, ρ indicates the ionomer density, λ indicates the water content in the electrode catalyst layer (the number of water molecules per sulfonic acid molecule), and EW indicates the acid group density. ε, ρ, EW are physical values and are constants. In this embodiment, scavenging is performing when the operation of the fuel cell system 100 is stopped, and presuming that the electrode catalyst layer does not contain any water, the water content λa of the anode-side catalyst layer 13a is taken to be 0. On the other hand, the cathode-side catalyst layer 13c is taken to have a water content λc of 14, considering that the water content becomes a maximum immediately due to water generated by power generation.

$$Jz = i/F \times Da \quad \text{(Expression 7)}$$

In (Expression 7) described above, i indicates the current density, F indicates Faraday's constant, and Da indicates the water production coefficient. In other words, the accompanying water flux is proportional to the current density.

The reversely diffused water flux and the accompanying water flux are calculated on the basis of (Expression 1) to (Expression 7) above, and the allowable time corresponding to the current density is calculated with respect to the anode-side catalyst layer 13a and the cathode-side catalyst layer 13c. In this embodiment, the reversely diffused water amount, the accompanying water amount, the water content of the electrolyte membrane 12 and the pore quantity of the catalyst layer are calculated as weights (mg/cm$^2$) per unit surface area, but may also be calculated as volumes. The pore quantity of the catalyst layer is calculated as a weight by assuming that water has entered into the pores. In this embodiment, the allowable time table 24 which indicates the allowable time with respect to the current density is represented as a curve (assuming that continuous values are set), but this table may also be defined in terms of discrete values. Furthermore, the table may be set by carrying out prior experimentation. Moreover, the reversely diffused water amount and the accompanying water amount may be calculated by the method described in JP 2011-113774 A.

Figure 4:
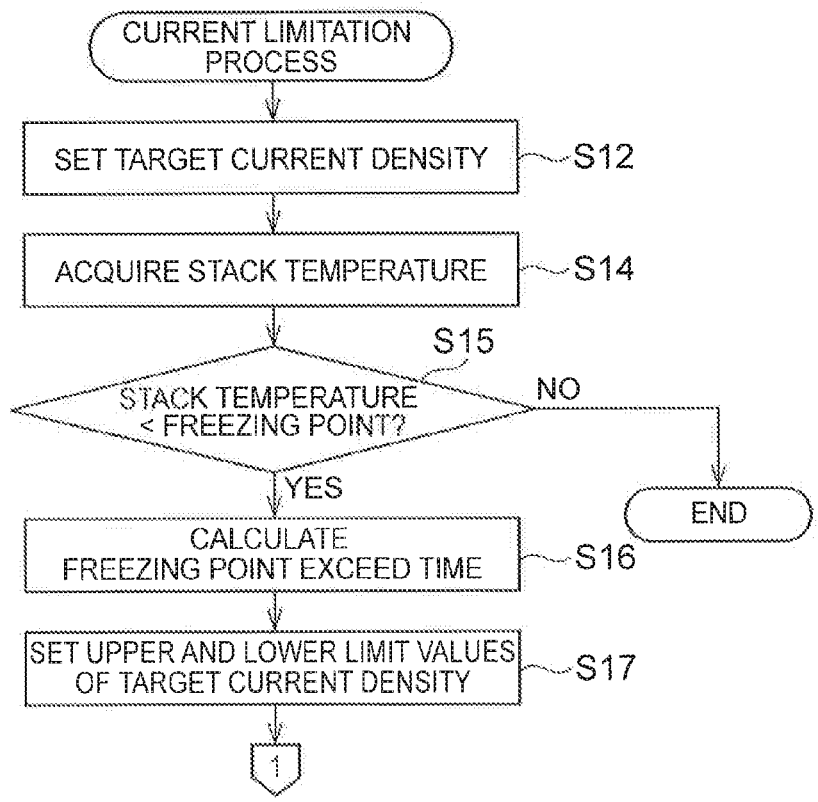
FIG. 4 is a flowchart showing a procedure of a current limitation process which is carried out in a fuel cell system.
Figure 5:
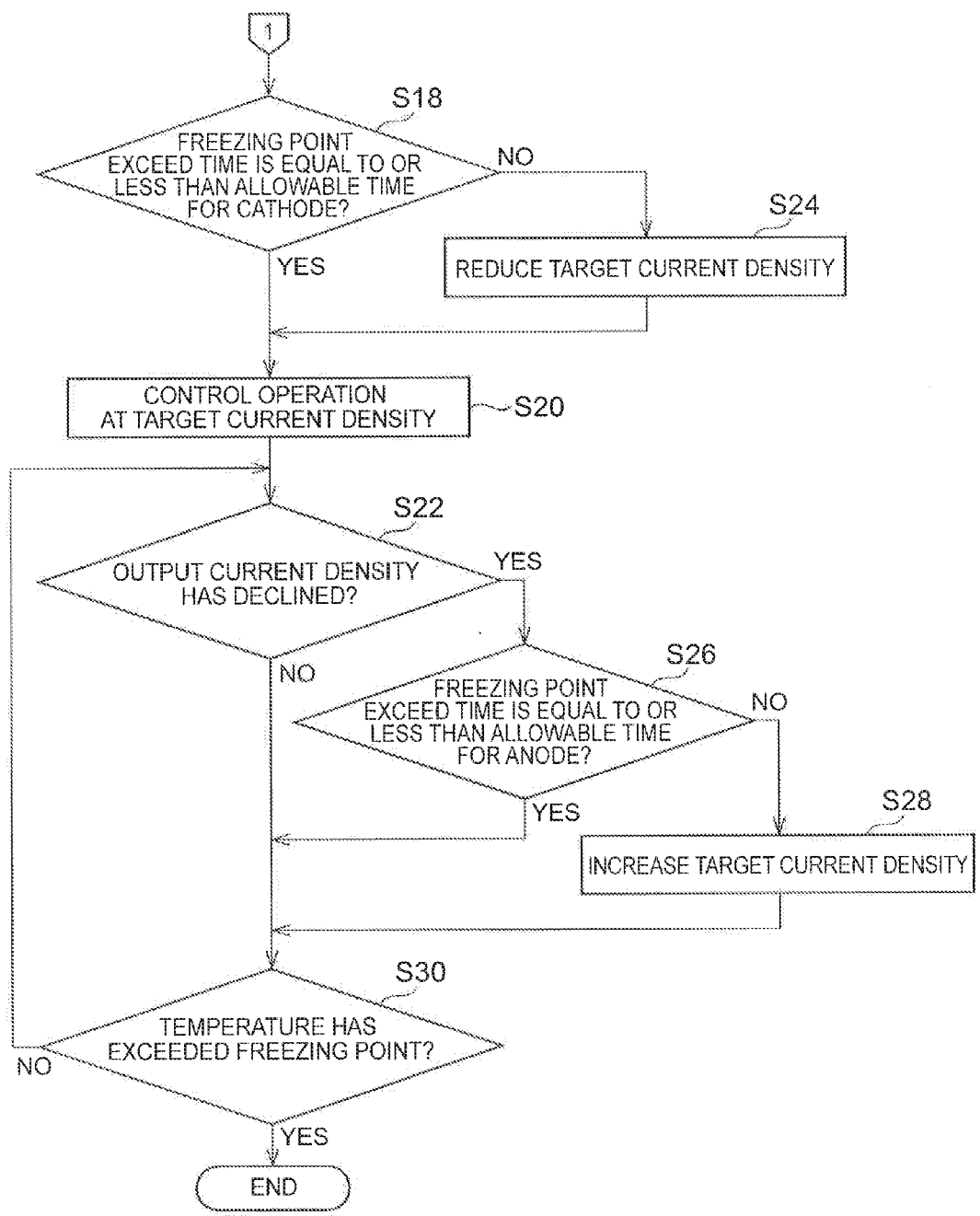
FIG. 5 is a flowchart showing a procedure of a current limitation process which is carried out in a fuel cell system.

(A3) Current limitation process: FIGS. 4 and 5 are flowcharts indicating the procedure of a current limitation process which is carried out in the fuel cell system 100. When the ignition of the electric automobile (not illustrated) is switched on, a current limitation process is started in the fuel cell system 100.

As shown in FIG. 4, the control unit 20 sets a target current density on the basis of the required output power corresponding to the detection value acquired from the accelerator position sensor 32 (step S12). The target current density is set on the basis of the W-I characteristics relating to the fuel cell stack 110 which are stored previously in the control unit 20. The control unit 20 acquires the temperature of the fuel cell stack 110 from the temperature measurement unit 74 (step S14), and determines whether or not the temperature is lower than freezing point (step S15). In this embodiment, the freezing point is taken to be 0° C., but the freezing point may be set in accordance with the conditions (air pressure) where the fuel cell stack 110 is used. In step S15, when the temperature of the fuel cell stack 110 is determined to be equal to or higher than freezing point, then the control unit 20 terminates the current limitation process.

When the control unit 20 determines in step S15 that the temperature of the fuel cell stack 110 is lower than freezing point, then the time taken until the temperature of the fuel cell stack 110 becomes equal to or higher than freezing point is calculated (step S16). In this embodiment, a situation where the temperature of the fuel cell stack 110 is equal to or higher than freezing point is called "freezing point exceed". The time until the temperature of the fuel cell stack 110 exceeds the freezing point (below, this is also called "freezing point exceed time") is calculated on the basis of the temperature of the fuel cell stack 110 acquired in step S14, the thermal capacity of the fuel cell stack 110, and the total calorific value of the fuel cell stack 110 when generating power at the target current density. In this embodiment, the freezing point exceed time is calculated, but it is also possible to provide a table which indicates the correspondences between the temperature of the fuel cell stack 110, the target current density and the freezing point exceed time, in advance, and to obtain the freezing point exceed time by referring to the table.

The control unit 20 sets upper and lower limit values of the target current density in such a manner that the freezing point exceed time becomes equal to or lower than the allowable time, on the basis of the freezing point exceed time calculated in step S16 and the allowable time table 24 (FIG. 3) (step S17). More specifically, as shown in FIG. 3, the current density at which the freezing point exceed time and the anode-side allowable time are the same is set as the lower limit value, and the current density at which the freezing point exceed time and the cathode-side allowable time are the same is set as the upper limit value. In this embodiment, the heat capacity and the calorific value of the fuel cell 10 are designed in such a manner that the freezing point exceed time is below the intersection of the anode and cathode curves in FIG. 3.

As shown in FIG. 5, the control unit 20 determines whether or not the freezing point exceed time calculated in step S16 is equal to or less than the allowable time for the cathode (at the target current density set in step S12) (step S18). In step S18, the control unit 20 controls the operation of the fuel cell stack 110 in such a manner that power is output at the target current density set in step S12, when the freezing point exceed time is determined to be equal to or less than the allowable time for the cathode (step S20). On the other hand, when the freezing point exceed time is determined to be longer than the allowable time for the cathode (NO at step S18), then the control unit 20 lowers the target current density on the basis of the allowable time table and sets the target current density to the upper limit value set in step S17. In other words, the control unit 20 resets the target current density, regardless of the required power (step S24). The control unit 20 controls the operation of the fuel cell stack 110 so as to output power at the target current density that has been reset (step S20). In this embodiment, in step S24, the target current density is set to the upper limit value set in step S17, but the invention is not limited to this. For example, a configuration may be adopted in which a decrease amount Δ1 when resetting the target current density is set in advance, and resetting is carried out repeatedly until the target current density becomes a value lower than the upper limit value set in step S17, whereby the target current density is reset to a value lower than the upper limit value. Furthermore, when the upper and lower limit values of the target current density are set (step S17), the target current density may also be set appropriately on the basis of the upper and lower limit values, for instance, to the median value of the upper and lower limit values, or a value obtained by subtracting a predetermined value from the upper limit value. Furthermore, in this embodiment, in step S18, it is only determined whether or not the freezing point exceed time is equal to or less than the allowable time for the cathode, but it may also be determined whether or not the freezing point exceed time is equal to or less than the allowable times for both the cathode and the anode. Normally, the target current density set in step S12 is higher than the upper limit value of the target current density, which means that the exceed time will be equal to or less than the allowable time for the anode, provided that the exceed time is equal to or less than the allowable time for the cathode, and therefore it is sufficient to determine whether or not the exceed time is equal to or less than the allowable time for the cathode.

As shown in FIG. 5, the control unit 20 determines whether or not the current density has declined, on the basis of the measurement value of the current measurement unit 71 (step S22). This is because, when power is generated in the fuel cell stack 110 at or below freezing point, then the water generated by power generation freezes, thereby impeding the diffusion of the reaction gas, and the current density declines. In step S22, when it is determined that the current density has not declined, then the control unit 20 acquires the temperature of the fuel cell stack 110 from the temperature measurement unit 74 and determines whether or not the temperature has exceeded freezing point (step S30). The control unit 20 terminates the current limitation process when it is determined that the temperature has exceeded freezing point in step S30.

In step S22, when the current density is determined to have declined, the control unit 20 refers to the allowable time table 24, and determines whether or not the freezing point exceed time is equal to or less than the allowable time for the anode (at the declined current density) (step S26). This is because, when the current density is low, then the amount of reversely diffused water increases, and therefore the amount of water flowing into the anode-side catalyst layer 13a increases, and the allowable time becomes shorter. In step S26, when it is determined that the freezing point exceed time is equal to or less than the anode allowable time, then the control unit 20 advances to step S30. In step S26, when the freezing point exceed time is determined to be longer than the anode allowable time (NO at step S26), then the control unit 20 increases the target current density on the basis of the allowable time table 24, sets the target current density to the lower limit value set in step S17 (resets the target current density), and controls the operation of the fuel cell stack 110 so as to achieve the reset target current density (step S28). When the temperature of the fuel cell stack 110 has exceeded freezing point, the control unit 20 terminates the current limitation process and implements normal control of the operation of the fuel cell stack 110 on the basis of the required power. In this embodiment, in step S28, the target current density is set as the lower limit value set in step S17, but the invention is not limited to this. For example, the target current density may also be set to the upper limit value set in step S17. By adopting this configuration, it is possible to obtain a relatively large output current, while adjusting the in-flowing water amount to the anode-side catalyst layer 13a. Furthermore, it is also possible to set an increase range, similarly to step S24, or to set the value in step S17.

In step S30, when the temperature of the fuel cell stack 110 is less than freezing point, then the control unit 20 returns to step S22. In other words, there is a possibility of steps S22, S26, S28, S30 being repeated until the temperature of the fuel cell stack 110 exceeds freezing point. In step S28, the target current density is increased within the range of the lower and upper limit values of the target current density which are set in step S17. Therefore, the target current density does not increase endlessly.

Even though it has been determined in step S18 whether or not the freezing point exceed time is equal to or less than the allowable time for the anode, it is desirable to determine again, in step S26, whether or not the freezing point exceed time is equal to or less than the allowable time for the anode. The reason for this is that, when the power generating surface area is reduced due to freezing of the water flowing into the electrode catalyst layer, and the output current density becomes lower than the target current density, then even though the exceed time was equal to or less than the allowable time for the anode in step S18, there is a possibility that the exceed time will not be equal to or less than the allowable time at the reduced output current density.

In the current limitation process, the control unit 20 controls the electromagnetic valve 41, the circulation pump 42, the air compressor 50, and the like, so as to increase and decrease the output current by adjusting the flow volume of the reaction gas, the back pressure during supply of reaction gas, the output voltage, and the like. The fuel cell system 100 according to this embodiment is provided with a secondary cell (not illustrated) which functions as a subsidiary power source of the fuel cell 10, and as described above, when the fuel cell stack 110 is caused to generate power at an output current lower than the output current corresponding to the output required by the load, then the insufficiency of the output with respect to the output requirement is compensated for by the secondary cell. The secondary cell may be constituted of a rechargeable lithium ion cell, for example.

Figure 6:
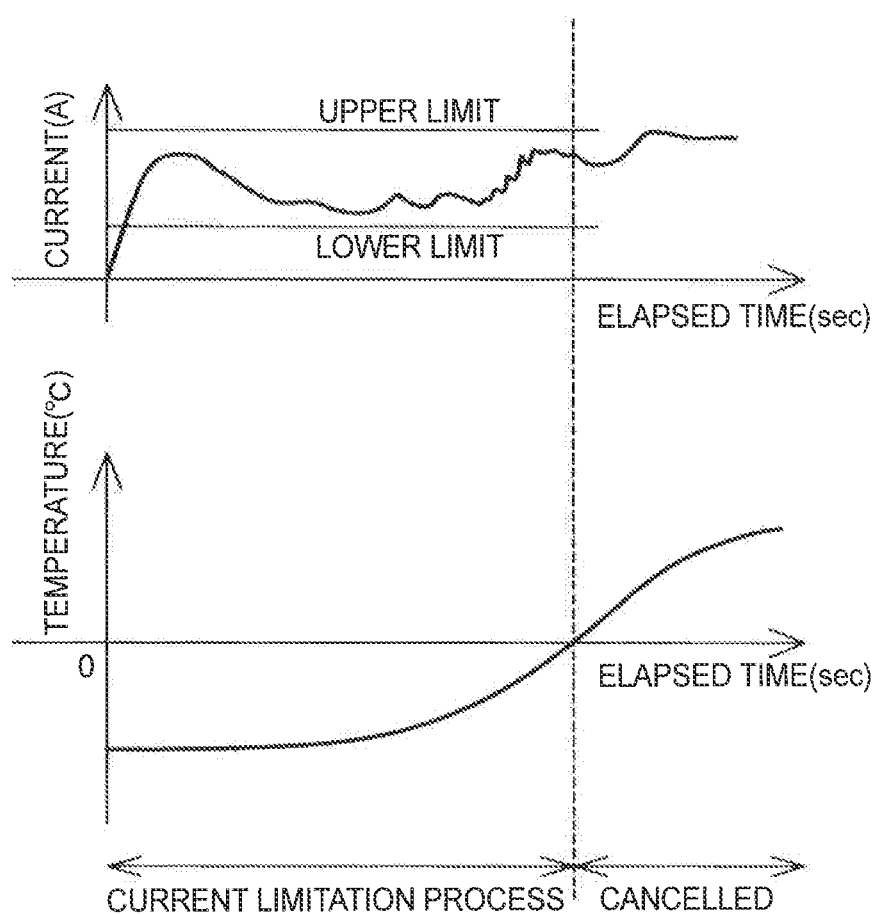
FIG. 6 is an illustrative diagram showing change in the output current of a fuel cell stack when a power limitation process is implemented.

FIG. 6 is an illustrative diagram showing temporal change in the output current of the fuel cell stack when a power limitation process is implemented. As shown in FIG. 6, in the fuel cell system 100 according to this embodiment, the output current of the fuel cell stack 110 is controlled so as to come between the upper and lower limit values of the target current, until the temperature of the fuel cell stack 110 becomes equal to or higher than freezing point.

(A4) Effects of embodiments: In the fuel cell system 100 according to this embodiment, the target current density is adjusted in such a manner that the in-flowing water amount to the anode-side catalyst layer 13a does not exceed the allowable amount. Consequently, the water flowing into the anode-side catalyst layer 13a is prevented from overflowing and collecting between the electrolyte membrane 12 and the anode-side catalyst layer 13a. As a result of this, when the fuel cell is started up below freezing point, it is possible to suppress the separation of the anode-side catalyst layer 13a from the electrolyte membrane 12, due to a phenomenon (such as frost heaving) which accompanies the freezing of collected water between the electrolyte membrane 12 and the anode-side catalyst layer 13a. Since the fuel cell system 100 according to this embodiment is formed without including a humidifier to humidify the reaction gas, and since the electrolyte membrane 12 has a small thickness, then the amount of reversely diffused water is large and collected water is liable to occur on the anode side. Therefore, it is considered that a significant effect in suppressing breakage of the anode-side catalyst layer 13a is obtained by carrying out the current limitation process described above.

Furthermore, in the fuel cell system 100 according to this embodiment, the target current density is set by taking account of the cathode-side in-flowing water amount as well. More specifically, the target current density is adjusted in such a manner that the amount of water flowing into the cathode-side catalyst layer 13c does not exceed the allowable amount. Therefore, when the fuel cell is started up below freezing point, it is possible to suppress separation of the cathode-side catalyst layer 3c from the electrolyte membrane 12, similarly to the anode side.

B: Modifications: This invention is not limited to the embodiments described above, and can be implemented in various modes without departing from the essence of the invention; for example, modifications such as the following are also possible.

(B1) First Modification: In the embodiment described above, the target current density is set by taking account of both the anode-side in-flowing water amount and the cathode-side in-flowing water amount, but the target current density may be set by taking account of the anode-side in-flowing water amount only. In other words, the target current density may be set on the basis of the allowable time table for the anode side only. Even when this configuration is adopted, it is possible to suppress separation of the anode-side catalyst layer 13a from the electrolyte membrane 12.

(B2) Second Modification: In the embodiment described above, the output current is limited, when the temperature of the fuel cell stack 110 is less than freezing point, but the temperature of the fuel cell stack 110 is not limited to freezing point, and can be set, as appropriate, to −5° C., 5° C., 10° C., and the like. Furthermore, the output current may also be limited, regardless of the temperature of the fuel cell stack 110. Even when this configuration is adopted, by keeping the in-flowing water amount to the electrode catalyst layer, to a suitable amount, it is possible to suppress deterioration of the electrode catalyst layer and/or decline in the power generation performance. It is desirable to implement limitation of the output current when the temperature of the fuel cell stack 110 is low.

(B3) Third Modification: In the embodiment described above, the allowable water amount is set on the basis of the maximum water content of the electrolyte membrane and the pore quantity of the electrode catalyst layer, but the invention is not limited to this. For instance, the allowable water amount may also be set by experimentation. Furthermore, a humidifier which humidifies the reaction gas may be provided in the fuel cell system, and the amount of water produced by the humidified reaction gas may also be taken into consideration.

(B4) Fourth Modification: In the embodiment described above, the upper and lower limit values of the target current density are set on the basis of the time taken until the temperature of the fuel cell stack 110 becomes equal to or higher than freezing point, but the invention is not limited to this. For example, the time taken until the temperature becomes 5° C. or above may be used, or a time may be set regardless of the temperature.

Figure 7:
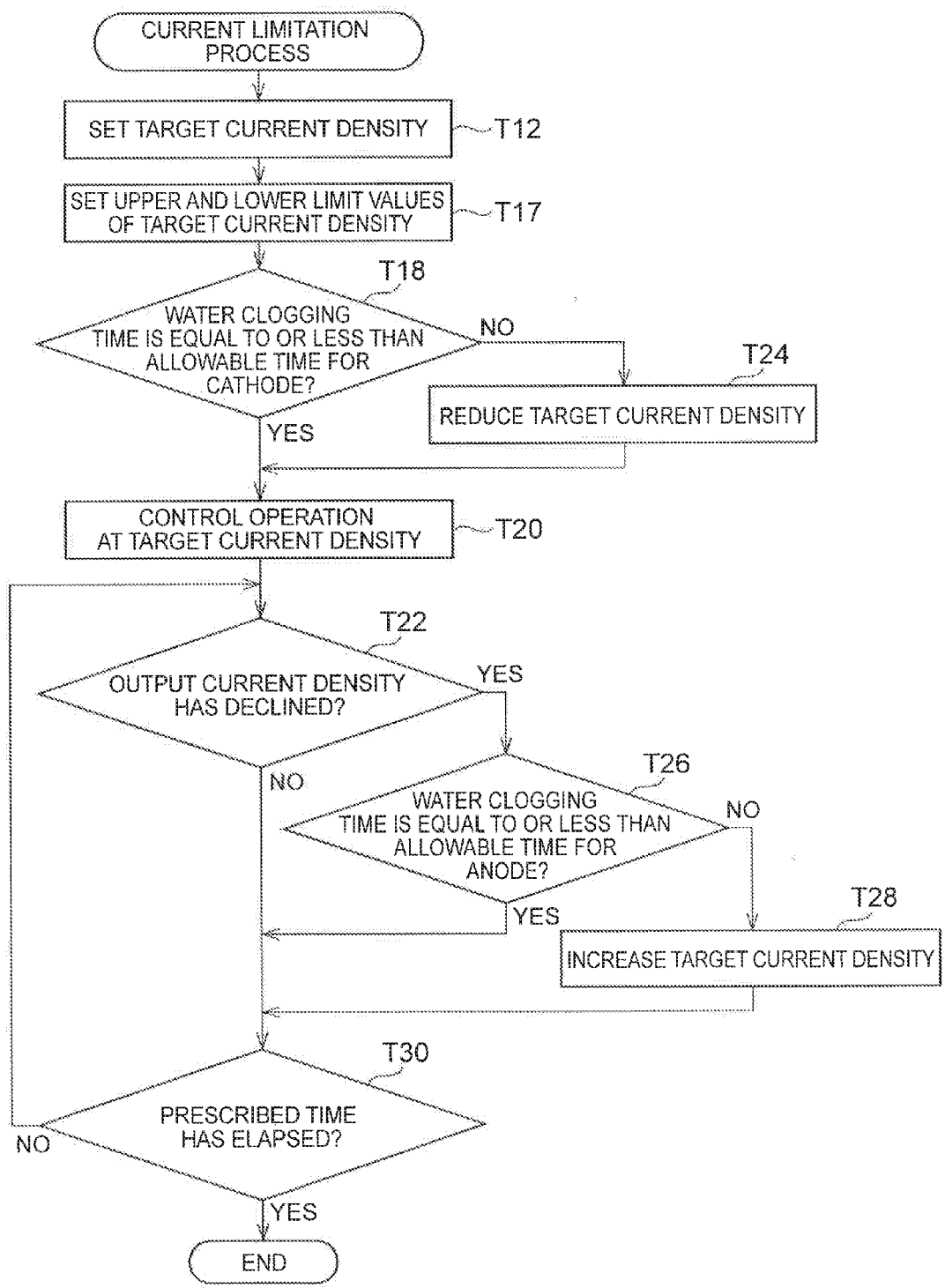
FIG. 7 is a flowchart showing a procedure of a current limitation process which is carried out in a fuel cell system according to a modification.

Below, one example of a case where the output current is limited regardless of the temperature of the fuel cell stack is described below with reference to FIG. 7. FIG. 7 is a flowchart showing a procedure of a current limitation process which is carried out in the fuel cell system according to this modification. The fuel cell system according to the modification has the same configuration as the embodiment described above, apart from the fact that the current limitation process carried out by the control unit is different to that of the embodiment described above. As shown in FIG. 7, the control unit 20 sets a target current density on the basis of the required output power corresponding to the detection value acquired from the accelerator position sensor 32, similarly to the embodiment described above (step T12). Next, the control unit 20 sets upper and lower limit values for the target current density (step T17). In this modification, a map (called a "water clogging time map" below), which is previously determined by experimentation and which indicates a relationship between the current density and the time taken until adequate power generation cannot be continued due to the occurrence of water clogging in the electrode catalyst layer (called "water clogging time" below), is provided in the control unit 20. The control unit 20 sets the upper and lower limit values for the target current density on the basis of the allowable time table and the water clogging time map.

Thereupon, the control unit 20 determines whether or not the water clogging time is equal to or less than the allowable time for the cathode (at the target current density set in step T12), on the basis of the allowable time table and the water clogging time map (step T18). In step T18, the control unit 20 controls the operation of the fuel cell stack 110 in such a manner that power is output at the target current density set in step T12, when the water clogging time is determined to be equal to or less than the allowable time for the cathode (step T20). On the other hand, when the water clogging time is determined to be longer than the allowable time for the cathode (NO at step T18), then the control unit 20 lowers the target current density on the basis of the allowable time table and sets the target current density to the upper limit value set in step T17. In other words, the control unit 20 resets the target current density, regardless of the required power (step T24). The control unit 20 controls the operation of the fuel cell stack 110 so as to output power at the target current density that has been reset (step T20).

The control unit 20 determines whether or not the current density has declined, on the basis of the measurement value of the current measurement unit 71 (step T22). When it is determined in step T22 that the current density has not declined, then the control unit 20 determines whether or not a previously determined prescribed time has elapsed (step T30). The control unit 20 terminates the current limitation process when it is determined that the prescribed time has elapsed in step T30. In this modification, the current limitation process terminates when a prescribed time has elapsed from the start (the start of counting when the ignition is switched on). The prescribed time is determined in advance as the time required for the start-up process, for instance.

In step T22, when the current density is determined to have declined, the control unit 20 refers to the allowable time table and the water clogging map, and determines whether or not the water clogging time is equal to or less than the allowable time for the anode (at the declined current density) (step T26). In step T26, when it is determined that the water clogging time is equal to or less than the anode allowable time, then the control unit 20 advances to step T30. In step T26, when the water clogging time is determined to be longer than the anode allowable time (NO at step T26), then the control unit 20 increases the target current density on the basis of the allowable time table 24, sets the target current density to the lower limit value set in step T17 (resets the target current density), and controls the operation of the fuel cell stack 110 so as to achieve the reset target current density (step T28). When the prescribed time has elapsed (YES in step T30), the control unit 20 terminates the current limitation process and implements normal operation control of the fuel cell stack 110 on the basis of the required power.

Even when this configuration is adopted, it is possible to adjust the amount of water flowing into both electrode catalyst layers, and to suppress decline in the fuel cell performance due to water clogging.

What is claimed is:

1. A fuel cell system, comprising:
a fuel cell having at least one combination of an electrolyte membrane and a cathode-side catalyst layer and an anode-side catalyst layer that are disposed in contact with the electrolyte membrane and have a plurality of pores;
an output current acquisition unit that is configured to acquire an output current of the fuel cell;
a control unit that is configured to operate the fuel cell such that the output current determined in accordance with an external load is output from the fuel cell; and
wherein the output current acquisition unit acquires a first output current of the fuel cell at a prescribed timing; and when the control unit determines that an anode in-flowing water amount, which flows to the anode-side catalyst layer when the fuel cell continues power generation at the first output current, exceeds a prescribed anode-side allowable water amount, the control unit is configured to perform current limitation control to operate the fuel cell at a second output current that is higher than the first output current, regardless of a requirement of the external load.

2. The fuel cell system according to claim 1,
further comprising a temperature acquisition unit that is configured to acquire a temperature of the fuel cell;
wherein the control unit is configured to perform the current limitation control based on the output current, when the acquired temperature is lower than a prescribed temperature.

3. The fuel cell system according to claim 2, wherein the control unit is configured to determine whether or not the anode in-flowing water amount exceeds the prescribed anode-side allowable water amount, by using the anode in-flowing water amount during a prescribed period set in accordance with the temperature of the fuel cell.

4. The fuel cell system according to claim 3, wherein
a time until the anode in-flowing water amount reaches the prescribed anode-side allowable water amount, when the fuel cell continues power generation at a prescribed output current, is set as an anode-side allowable time;

the control unit comprises:
an anode allowable time table indicating a relationship between the prescribed output current and the anode-side allowable time, and
the prescribed output current, at which the anode allowable-side time and the prescribed period are equal each other, is set as a lower limit of the second output current.

5. The fuel cell system according to claim 3, wherein the prescribed period is a period until the temperature of the fuel cell becomes equal to or higher than a freezing point.

6. The fuel cell system according to claim 2, wherein the prescribed temperature is a freezing point.

7. The fuel cell system according to claim 1, wherein the control unit, during the current limitation control, operates the fuel cell at a third output current that is lower than the first output current, regardless of the requirement of the external load, when the control unit determines that a cathode in-flowing water amount that flows to the cathode-side catalyst layer when the fuel cell continues power generation at the first output current exceeds a prescribed cathode-side allowable water amount.

8. The fuel cell system according to claim 7, wherein the control unit is configured to determine whether or not the cathode in-flowing water amount exceeds the prescribed cathode-side allowable water amount, by using the cathode in-flowing water amount during a prescribed period set in accordance with the temperature of the fuel cell.

9. The fuel cell system according to claim 8, wherein the time until the cathode in-flowing water amount reaches the prescribed cathode-side allowable water amount, when the fuel cell continues power generation at a prescribed output current, is set as a cathode-side allowable time;
the control unit comprises:
a cathode allowable time table indicating a relationship between the prescribed output current and the cathode-side allowable time, and
the prescribed output current, at which the cathode allowable time and the prescribed period are equal each other, is set as an upper limit of the third output current.

10. A control method for a fuel cell system having a fuel cell having at least one combination of an electrolyte membrane and a cathode-side catalyst layer and an anode-side catalyst layer that are disposed in contact with the electrolyte membrane and have a plurality of pores,
the control method comprising:
acquiring an output current of the fuel cell;
determining whether or not an anode in-flowing water amount, which flows to the anode-side catalyst layer when the fuel cell continues power generation at the acquired output current, exceeds a prescribed anode-side allowable water amount; and
operating the fuel cell at an output current that is higher than the acquired output current, regardless of a requirement of an external load, when it is determined that the anode in-flowing water amount, which flows to the anode-side catalyst layer when the fuel cell continues power generation at the acquired output current, exceeds the prescribed anode-side allowable water amount.

* * * * *